United States Patent [19]
Stelzer

[11] 3,993,361
[45] Nov. 23, 1976

[54] PRESSURE PROTECTION VALVE AND SYSTEM

[75] Inventor: Raymond F. Stelzer, Bel Nor, Mo.

[73] Assignee: Wagner Electric Corporation, Parsippany, N.J.

[22] Filed: Sept. 10, 1975

[21] Appl. No.: 612,203

Related U.S. Application Data

[63] Continuation of Ser. No. 455,625, March 28, 1974, abandoned.

[52] U.S. Cl. .................................. 303/64; 137/506; 137/508; 137/512.3; 137/614.2
[51] Int. Cl.² ................................................ B60T 15/00
[58] Field of Search .......... 137/496, 506, 508, 512, 137/512.3, 536, 542, 614.2; 303/29, 30, 64, 78, 80

[56] References Cited
UNITED STATES PATENTS

| | | | |
|---|---|---|---|
| 2,287,162 | 6/1942 | Bliss | 137/512.3 |
| 2,306,012 | 12/1942 | Campbell | 137/512 |
| 2,731,981 | 1/1956 | Glasser | 137/536 |
| 3,856,043 | 12/1974 | Feild et al. | 137/508 |

Primary Examiner—Alan Cohan
Assistant Examiner—Gerald A. Michalsky
Attorney, Agent, or Firm—James R. Bell

[57] ABSTRACT

A pressure protection valve includes a housing having first and second ends. A passageway is formed in the housing for interconnecting the ends to permit fluid to flow from the first to the second end. Also, the housing includes a first portion of the passageway adjacent the first end and a second portion of the passageway adjacent the second end. A pressure responsive element is provided in the first portion to respond to preselected pressure conditions for permitting and limiting the flow of fluid from the first to the second end. In addition, a check valve is provided in the second portion for permitting the flow of fluid from the first to the second end and for limiting the flow of fluid from the second to the first end.

1 Claim, 3 Drawing Figures

U.S. Patent  Nov. 23, 1976  3,993,361
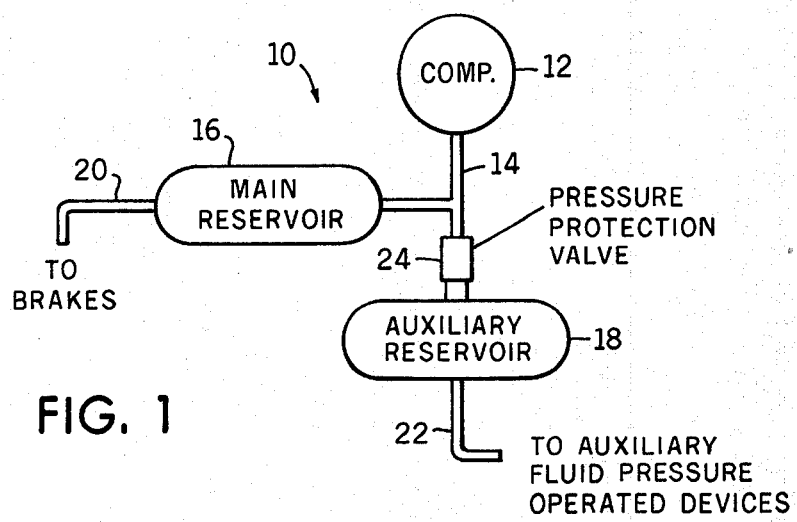
FIG. 1
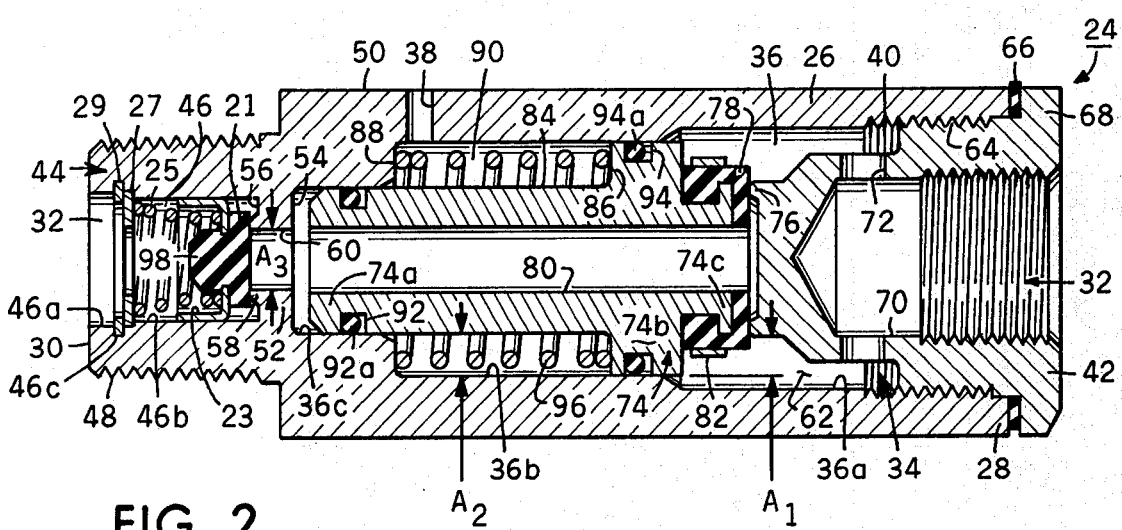
FIG. 2
FIG. 3

PRESSURE PROTECTION VALVE AND SYSTEM

This is a continuation, of application Ser. No. 455,625, filed Mar. 3, 1974, now abandoned.

BACKGROUND OF THE INVENTION

1. Field of the Invention

This invention relates generally to fluid handling and more specifically to line condition change responsive valves.

2. Discussion of the Prior Art

In braking systems using fluid pressure, fluid is generally supplied to the system by a compressor producing and feeding fluid under pressure to one or more fluid pressure reservoirs. The fluid pressure is stored in a main reservoir to be supplied on demand to braking components in the system, and also in an auxiliary reservoir to supply auxiliary fluid pressure operated devices. Generally a one-way check valve in the system, as is well known, permits fluid under pressure to pass in one direction from the compressor into either reservoir encountering nominal, if any, resistance but not in the opposite direction from the reservoirs back to the compressor. Once pressure across the check valve is substantially equal the check valve closes and is opened only to permit fluid pressure to pass through the valve when pressure on the compressor side of the valve is greater than pressure on the reservoir side of the valve. In this type of arrangement, pressure on the reservoir side of the valve would ordinarily never exceed the pressure on the compressor side of the valve as long as the compressor is operating to produce a pressure output. Should the compressor cease to produce pressure for some reason, and permit pressure on the reservoir side of the valve to exceed pressure on the compressor side, the valve, due to its one-way construction would prevent the escape of reservoir pressure, at least across the valve. It can be seen from the foregoing that as long as the compressor is producing pressure to the system fluid, the system reservoir fluid pressure should remain constant and that when system reservoir pressure begins to drop due to use of its stored pressure reserve, the check valve will open to receive fluid under pressure from the compressor to restore the system reservoir pressure. One shortcoming of having only a one-way check valve between a compressor and a reservoir is that in the event of a leakage to atmosphere of, for example, the auxiliary reservoir pressure, direct leakage would result in that the fluid pressure output of the compressor would meet no substantial resistance in encountering the check valve at the auxiliary reservoir. Thus, none of the fluid pressure output of the compressor would be available to replenish the main reservoir supply when needed and eventually no fluid pressure would be available for braking operations. It would be of benefit to fluid pressure braking systems to supply fluid under pressure to the auxiliary reservoir through a protecting device capable of limiting the possible loss of fluid pressure from the fluid pressure source to some predetermined minimum value so that some fluid pressure output of the compressor would be available to replenish the main reservoir supply for needed braking operations.

SUMMARY OF THE INVENTION

Accordingly, the present invention provides a valve capable of limiting the loss of system fluid pressure from a compressor to a predetermined minimum value. The foregoing is accomplished by providing a valve including a pressure responsive element capable of permitting fluid pressure to pass through the valve when the pressure differential across the element exceeds a predetermined value and capable of limiting the fluid pressure from passing through the valve when the pressure differential across the element is less than the predetermined value. Once fluid pressure has passed the element it proceeds by the check valve and into the reservoir. Thus, fluid pressure passing the element is not affected by or dependent upon the pressure in the reservoir. The one-way operation of the check valve isolates the element from the pressure in the reservoir.

Other advantages and novel features of the invention will become apparent from the following detailed description of the invention when considered in conjunction with the accompanying drawings.

BRIEF DESCRIPTION OF THE DRAWINGS

In the drawings wherein like parts are marked alike:

FIG. 1 is a partial diagrammatic view of a fluid pressure braking system including the pressure protection valve of this invention;

FIG. 2 is a cross-sectional side elevation of the preferred embodiment of this invention; and FIG. 3 is a partial cross-sectional side elevation of an alternative embodiment of this invention.

DESCRIPTION OF THE PREFERRED EMBODIMENT

Referring now to the drawings, FIG. 1 illustrates in part, a fluid pressure vehicle braking system 10 which comprises a fluid pressure producing source such as compressor 12 connected by conduit 14 to supply fluid under pressure to main reservoir tank 16 and auxiliary reservoir tank 18. Fluid, such as air, under pressure is supplied to the brakes (not shown) by conduit 20 whereas conduit 22 carries air from auxiliary reservoir 18 to auxiliary air pressure operated devices as, for example, air horns, various power equipment and the like.

Interposed between compressor 12 and auxiliary reservoir 18 is pressure protection valve 24. FIG. 2 illustrates valve 24 in detail. The valve generally comprises housing 26 having a first end 28 and a second end 30. The housing is preferably of a suitable metal and may be cast and machined to specifications. Passageway 32 is formed through the housing for permitting fluid to flow from first end 28 to second end 30 and further includes a first portion 34 adjacent first end 28 comprising stepped bore 36 having stepped portions 36a, 36b and 36c which sequentially decrease in diameter as bore 36 extends into housing 26 from first end 28 toward second end 30. Housing 26 also includes port 38 extending through the housing at stepped portion 36b for communicating bore 36 through outer circumference 50 of housing 26 with atmosphere. Stepped portion 36a of bore 36 includes internal threaded portion 40 adjacent first end 28 for receiving insert 42 as will be discussed later in greater detail.

Second end 30 of housing 26 includes second portion 44 as part of passageway 32. Second portion 44 generally comprises a counterbore 46 adjacent second end 30 and extending into housing 26 toward first end 28. Counterbore 46 is stepped into portions 46a and 46b decreasing in diameter in the direction of first end 28.

Also snap ring groove 46c is formed in stepped portion 46a for accommodating a snap ring to be discussed later in greater detail. Outer circumference 48 of second portion 44 is threaded for engagement with auxiliary reservoir 18. First and second portions 34, 44, respectively, terminate adjacent and are separated by annular land 52 having a first radial face 54 adjacent first portion 34 and a second radial face 56 adjacent second portion 44. Second radial face 56 includes valve seat 58 which will be explained further. Passageway 32 is completed through housing 26 by bore 60 interconnecting bores 36, 46 through annular land 52. In this manner, passageway 32 may permit fluid to flow through housing 26 from first end 28 to second end 30.

Insert 42 is preferably formed of a suitable metal and is threadedly received in first portion 34 of housing 26. Threaded portion 40 adjacent first end 28 accommodates correspondingly threaded portion 64 of insert 42. Gasket 66 is interposed between flange 68 of insert 42 and first end 28 of housing 26. Bore 70 and port 72 formed in insert 42 are part of passageway 32 and permit fluid to flow from the fluid producing source into the housing at a first cavity 62 bounded by stepped portion 36a, insert 42 and a portion of piston 74. Valve seat 76 is preferably formed on insert 42 for engaging sealing portion 78 of piston 74.

Piston 74 is preferably formed of a suitable metal and is elongated and includes piston passageway 80 formed therethrough to form part of passageway 32. Extended reduced portion 74a of piston 74 is accommodated by stepped bore portion 36c of bore 36, whereas a flange type or increased diameter portion 74b of piston 74 is accommodated by stepped bore portion 36b. Sealing portion 78 is retained on piston 74 by flange portion 74c and retaining ring 82. Outer circumference 84 of extended reduced portion 74a, radial surface 86 of flange 74b, radial surface 88 of housing 26 and stepped bore portion 36b of bore 36 to form second cavity 90 exposed to atmospheric pressure through port 38 formed in housing 26. Annular groove 92 accommodates O-ring 92a for sealing engagement between piston portion 74a and bore portion 36c. Annular groove 94 accommodates O-ring 94a for sealing engagement between piston portion 74b and bore portion 36b. Resilient member or first spring 96 urges or biases piston 74 into sealing engagement with valve seat 76. Piston 74 is movable within bore 36 between valve seat 76 and radial face 54 of housing 26 adjacent bore 60.

Stepped portion 46b of counterbore 46 accommodates check valve 98 which comprises resilient sealing valve member 21 urged into sealing engagement with valve seat 58. Valve guide member 23 engages stepped portion 46b of counterbore 46 to maintain valve member 21 aligned for sealing engagement with valve seat 58. Second spring or resilient member 25 urges or biases member 21 into sealing engagement with the valve seat. Spring retainer 27 and snap ring 29 in groove 46c maintain spring 25 in position within counterbore 46.

It may be preferred that insert 42 include a flange portion 31 for retaining sealing portion 33 thereon, see FIG. 3. Also, retaining ring 35 may assist in retaining sealing portion 33 in position. Piston 74 may include valve seating portion 37 urged into sealing engagement with sealing portion 33 by first spring 96.

In operation, the first pressure responsive means includes sealing means such as piston 74 including passageway 80 and sealing member 78; and insert 42 including valve seat 76, whereby the piston with a passageway and a sealing member, and the insert with a valve seat are relatively movable in first passageway 32 for permitting fluid communication between first and second passageways 32, 80, respectively. Also spring 96 biases sealing means 78 into sealing position with valve seat 76 for limiting fluid communication between the first and second passageways.

The first pressure responsive means may include a valve seat 76 and a piston 74 movably mounted in passageway 32 including sealing portion 78 mounted thereon for sealingly engaging valve seat 76. Also, passageway 80 is formed through piston 74 for permitting fluid to flow therethrough when sealing portion 78 and valve seat 76 are disengaged. Further, spring 96 biases piston 74 into sealing engagement with valve seat 76.

As illustrated in FIG. 3, it may be preferred that the first pressure responsive means include sealing member 33 mounted on insert 42 and piston 74 movably mounted in bore 36 forming part of first passageway 32. Piston 74 may include valve seat 37 formed thereon for sealingly engaging the sealing member. Second passageway 80 through piston 74 permits fluid to flow therethrough from the first end 28 to the second end 30 when the sealing member and the valve seat are disengaged.

Second pressure responsive means or check valve 98 is provided in second portion 44 for permitting the flow of fluid from first end 28 to second end 30 and for limiting the flow of fluid from second end 30 to first end 28. In accordance with well known check valve principles, fluid under pressure will flow between sealing member 21 and valve seat 58 from the first to the second end when fluid pressure adjacent the first end is greater than pressure adjacent the second end due to the negligible effect of second spring 25 and fluid will not flow between sealing member 21 and valve seat 58 from the second to the first end since pressure exerted on sealing member 21 will only urge the member and the seat into tighter sealing engagement.

Piston 74 includes a first area $A_1$ exposed to fluid pressure adjacent the first end 28 entering cavity 62 through port 72 of insert 42 and a second area $A_2$ opposite the first area exposed to atmospheric pressure entering cavity 90 through 38 in housing 26. When fluid under pressure from compressor 12 enters passageway 32 adjacent the first end 28 a first predetermined pressure $P_1$ greater than atmospheric pressure acts on first area $A_1$ to produce a first force $P_1A_1$ which tends to urge piston 74 toward the second end. Atmospheric pressure $Po$ acts on second area $A_2$ to produce a second force $Po\,A_2$ in opposition to force $P_1A_1$. Also, a force $F_1$ exerted by first spring 96 acts on piston 74 in opposition to force $P_1A_1$ so that piston 74 is urged toward the second end due to the following first pressure differential thereacross: $P_1$ is sufficiently greater than $Po$ so that $P_1A_1 > PoA_2 + F_1$.

Once piston 74 is displaced enough to disengage sealing member 78 from valve seat 76 fluid under pressure $P_1$ in cavity 62 passes through second passageway 80 in piston 74 and through bore 60. Member 21 includes a third area $A_3$. When pressure $P_1$ acts on area $A_3$ a third force $P_1A_3$ urges member 21 out of engagement with valve seat 58 inasmuch as the negligible force $F_2$ of spring 25 yields to the overpowering force $P_1A_3$. Pressure then builds in auxiliary reservoir 18 until the forces on opposite sides of sealing member 21 are substantially balanced thus causing member 21 biased by spring force $F_2$ to be urged into sealing engagement with valve seat 58. Thus, under these conditions, auxiliary reservoir 18 ceases to demand or accept fluid under pressure $P_1$ from compressor 12. Upon the closing of check valve 98, force $P_1A_1$ continues to urge piston 74 to the left, as shown in the drawing, until the piston seats against radial face 54.

Under the above-mentioned conditions, should a failure occur at the second end of valve 24, that is, should a leak occur in auxiliary tank 18 which would expose check valve 98 to atmospheric pressure, the force $P_1A_3$ would open the check valve 98 since $P_1$ is greater than atmospheric pressure permitting fluid under pressure $P_1$ to pass the check valve. Ultimately, of course, without resistance to permit pressure buildup, pressure $P_1$ would be reduced to atmospheric pressure after passing through check valve 98. Eventually, the reduction in pressure $P_1$ would be reduced within valve 24 to pressure level $Po$ on either side of check valve 98. As a result, second pressure $P_2$ will be established adjacent first end 28 since the only resistance permitting a pressure buildup is due to the force $Po\ A_2 + F_1$ urging piston 74 into engagement with seat 76. Second pressure $P_2$ is less than $P_1$ and greater than $Po$. Due to the additional force $F_1$ of spring 96, the opposing forces acting on piston 74 results in the following second pressure differential thereacross: $P_2$ is greater than $Po$ but $F_1$ is significant so that $P_2A_1 > PoA_2 + F_1$. Since the larger force $PoA_2 + F_1$ urges sealing member 78 into engagement with seat 76, a protected system pressure $P_2$ is established as a second predetermined pressure within conduit 14 and main reservoir 16. Second or protected system pressure $P_2$ is thus established adjacent first end 28 while atmospheric pressures $Po$ and $P_2$ are separated due to the engagement of sealing member 78 and seat 76 influenced by the predetermined force $F_1$. Thus the protected system pressure would be a predetermined minimum pressure preserved for the main reservoir and available for braking.

The foregoing has described a valve and system capable of limiting the loss of system fluid pressure from a compressor to a predetermined minimum value to be used within the system.

Many modifications and variations of the present invention may be possible in the light of the above teachings. It is therefore to be understood that within the scope of the appended claims the invention may be practical otherwise than as specifically described.

Having thus described the invention in its best embodiment and mode of operation, that which is desired to be claimed by Letters Patent is:

1. A fluid pressure vehicle braking system comprising:
    a fluid pressure producing source,
    a fluid pressure main reservoir tank connected to receive fluid under pressure from the source;
    a plurality of vehicle braking means connected to receive fluid under pressure from the fluid pressure main reservoir tank;
    a housing having a first end connected to receive fluid from the source and a second end connected to deliver fluid to an auxiliary reservoir tank;
    the housing having a passageway therethrough for permitting fluid to flow from the first to the second end and further including a first portion of the passageway adjacent the first end and a second portion of the passageway adjacent the second end;
    first pressure responsive means in the first portion biased by a predetermined force $F_1$ and permitting the flow of fluid from the first to the second end only when a force applied thereagainst exceeds $F_1$, said force $F_1$ resulting at least in part from atmospheric pressure and said first pressure responsive means including communication means for communicating said first pressure responsive means with the atmosphere;
    second pressure responsive means in the second portion said second pressure responsive means comprising a valve seat and a sealing valve member one of which is composed of a resilient material biased thereagainst by a spring member which applies a predetermined force $F_2$;
    said force $F_2$ being nominal with respect to said force $F_1$;
    said second pressure responsive means permitting the flow of fluid from the first to the second end only when a fluid force is applied thereagainst which exceeds $F_2$; and
    said second pressure responsive means preventing the flow of fluid from the second end to the first end of said housing.

* * * * *

UNITED STATES PATENT OFFICE
CERTIFICATE OF CORRECTION

PATENT NO. : 3,993,361
DATED : November 23, 1976
INVENTOR(S) : Raymond F. Stelzer It is certified that error appears in the above—identified patent and that said Letters Patent are hereby corrected as shown below:

Column 1, line 3, delete "3" and insert -- 28 --. Column 3, line 38, after "36" delete -- to --. Column 5, line 28, " $>$ " should be -- $<$ --; line 35, delete entire line and insert -- pressure Po is established adjacent second end 30. The --.

Signed and Sealed this

Eighth Day of February 1977

[SEAL]

Attest:

RUTH C. MASON
Attesting Officer

C. MARSHALL DANN
Commissioner of Patents and Trademarks